(12) United States Patent
Chung et al.

(10) Patent No.: US 7,605,186 B2
(45) Date of Patent: Oct. 20, 2009

(54) NON-ACIDIC, NON-BASIC COLLOID SOLUTION CONTAINING DISPERSED TITANIUM DIOXIDE METHOD OF MANUFACTURING THE SAME, AND COATING MATERIAL COMPRISING THE COLLOID SOLUTION

(75) Inventors: Hoon Chung, Incheon (KR); Jung Chan Ko, Incheon (KR); Tae Man Son, Incheon (KR); Kyoung Chul Lee, Gyeonggi-Do (KR)

(73) Assignee: Sunhanmnt Co., Ltd. (KR)

( * ) Notice: Subject to any disclaimer, the term of this patent is extended or adjusted under 35 U.S.C. 154(b) by 413 days.

(21) Appl. No.: 10/490,904

(22) PCT Filed: May 30, 2003

(86) PCT No.: PCT/KR03/01063

§ 371 (c)(1),
(2), (4) Date: Mar. 26, 2004

(87) PCT Pub. No.: WO2004/087578

PCT Pub. Date: Oct. 14, 2004

(65) Prior Publication Data

US 2004/0241502 A1    Dec. 2, 2004

(30) Foreign Application Priority Data

Apr. 3, 2003    (KR) .................. 10-2003-0021092

(51) Int. Cl.
  *B01F 3/12*    (2006.01)
  *C01G 23/053*  (2006.01)
  *C09C 1/36*    (2006.01)
  *F21V 9/06*    (2006.01)
  *C09K 3/18*    (2006.01)

(52) U.S. Cl. .................. 516/90; 106/287.19; 106/436; 502/227

(58) Field of Classification Search .................. 516/90; 106/287.19, 436; 502/227
See application file for complete search history.

(56) References Cited

U.S. PATENT DOCUMENTS

| | | | | |
|---|---|---|---|---|
| 3,317,396 A | * | 5/1967 | Tamas | 424/52 |
| 4,361,598 A | * | 11/1982 | Yoldas | 427/74 |
| 5,342,431 A | * | 8/1994 | Anderson et al. | 95/45 |
| 5,846,511 A | | 12/1998 | Kim et al. | |
| 5,897,958 A | * | 4/1999 | Yamada et al. | 446/474 |
| 6,001,326 A | * | 12/1999 | Kim et al. | 423/598 |
| 6,074,472 A | * | 6/2000 | Jachow et al. | 106/436 |
| 6,329,058 B1 | * | 12/2001 | Arney et al. | 428/403 |
| 6,340,711 B1 | | 1/2002 | Ohmori et al. | |
| 6,420,437 B1 | * | 7/2002 | Mori et al. | 516/90 |
| 6,770,216 B2 | * | 8/2004 | Takahashi et al. | 252/1 |

FOREIGN PATENT DOCUMENTS

| | | | |
|---|---|---|---|
| EP | 1 052 225 A1 | | 11/2000 |
| EP | 1 167 296 A1 | * | 1/2002 |
| JP | 62-226814 | | 10/1987 |

OTHER PUBLICATIONS

PCT Application Publication No. WO 2004/087578 A1 including International Search Report from WIPO for Application No. PCT/KR03/01063 including the references cited above, (Oct. 2004).
Form PCT/IB/306 Notification Of The Recording Of A Change form in which inventor Kyoung Chul LEE has been recorded as applicant for the US only and inventor for all designated States, (Nov. 2004).

* cited by examiner

*Primary Examiner*—Daniel S Metzmaier
(74) *Attorney, Agent, or Firm*—Baker & Hostetler, LLP

(57) ABSTRACT

A method of manufacturing a neutral and transparent metal oxide colloid solution containing dispersed titanium dioxide nano particles comprising the steps of (i) adding a titanium compound and a stabilizer to alcohol to produce a titanium-containing solution and (ii) neutralizing the titanium-containing solution of step (i) by adding a basic solution to produce a neutralized solution with the pH of the neutralized solution in a range of 6-8; and (iii) heating the neutralized solution at a temperature of above 75° C.

6 Claims, 5 Drawing Sheets

NON-ACIDIC, NON-BASIC COLLOID SOLUTION CONTAINING DISPERSED TITANIUM DIOXIDE METHOD OF MANUFACTURING THE SAME, AND COATING MATERIAL COMPRISING THE COLLOID SOLUTION

FIELD OF THE INVENTION

The present invention relates to a method of manufacturing a non-acidic, non-basic, transparent titanium dioxide colloid solution which is dispersed with nano-sized titanium dioxide particles, and improved titanium dioxide colloid solution prepared by the method. Also, the present invention relates to a multifunctional, normal temperature curing-type coating agent comprising a proper additive in addition to the titanium dioxide colloid solution.

BACKGROUND OF THE INVENTION

Titanium dioxide is used in various fields such as optics, pigment, semiconductor, catalyst, ultraviolet blocking agent, polymer filler and ceramics since it is chemically and physically stable. In particular, if the titanium dioxide becomes nano-sized particles, its specific surface area and the number of particles are largely increased, giving it various applications such as photocatalyst, ultraviolet blocking agent, or filler for transparent polymer materials, and the like. For example, when one spherical micron size particle is divided into nano-sized particles, the number of particles can be increased to 1 billion and its specific surface area is increased a million times. Therefore, the UV blocking effect by nano-sized particles is increased (about a billion times) and its catalytic property may be increased to 1 million times that of nano-sized particles of the same weight.

However, if the specific surface area of particles is largely increased, it is accompanied by an increase of the surface tension thereof in the same condition. As a result, the particles may be easily coagulated, which results in an increase of particle size. Since the nano-sized particles are metastable, the state of such particles are unstable. On the other hand, such unstable particles can be easily adsorbed and adhered onto the surface of other bodies.

The point of zero charge of titanium dioxide particles' surface that suppresses coagulation of the particles in a solution is acidic. For this reason, a strong acidic solution dispersed with titanium dioxide particles has been prepared so as to prevent the titanium dioxide particles from coagulating. This strong acidic property restricts the use of the colloid solution containing dispersed titanium dioxide particles or the solution containing dispersed macro particles, and causes a dangerous problem to the working environment or workers.

A method of manufacturing a neutral titanium dioxide solution to solve the above problems has been developed, but this method is comprised of several steps, such as precipitating titanium dioxide in the aqueous solution, filtering the precipitates and then drying, and re-dispersing it in the solvent by an ultrasonic method or vigorous mechanical stirring method. However, because it is impossible to re-ground and re-disperse the coagulated nano-sized particles by using an ultrasonic method or stirring method, and the filtering step is a time consuming procedure, its productivity is very low and the cost of production is very high. Furthermore, the nano-sized particles can be easily re-coagulated at a little higher temperature, thus a transparent colloid solution which is uniformly dispersed with nano-sized particles of less than 10 nm could not be produced by this method.

Furthermore, due to such a coagulation phenomenon, less than 3% of titanium dioxide can be dispersed in the conventional titanium dioxide colloid solution. Such low concentration of titanium dioxide colloid solution causes serious problems of cost, applicability or productivity, etc., due to difficulties in transportation, storage or production.

The present invention provides a method of manufacturing a colloid solution which is dispersed with nano-sized titanium dioxide particles in one step without performing conventional multi-steps, including the filtering or re-dispersing steps. More particularly, the present invention provides a colloid solution which is 1~5% by weight of dispersed titanium dioxide which is superior to the conventional colloid solution, which is 1~3% by weight of dispersed titanium dioxide.

The titanium dioxide colloid solution prepared by the present method is a high concentration (3~5% by weight) and neutral solution, thus its application field can be greatly extended.

DISCLOSURE OF THE INVENTION

An object of the present invention is to provide a method of manufacturing a neutral and transparent titanium dioxide ($TiO_2$) colloid solution in which nano-sized titanium dioxide particles are dispersed.

Another object of the present invention is to provide a neutral and transparent titanium dioxide ($TiO_2$) colloid solution prepared by the present method, in which nano-sized titanium dioxide particles are dispersed.

Yet another object of the present invention is to provide a multifunctional, normal temperature curing-type coating agent containing the said titanium dioxide ($TiO_2$) colloid solution.

The said objects and other objects may be achieved according to the present invention illustrating herein below.

DETAILED DESCRIPTION OF THE INVENTION

Figure 1:
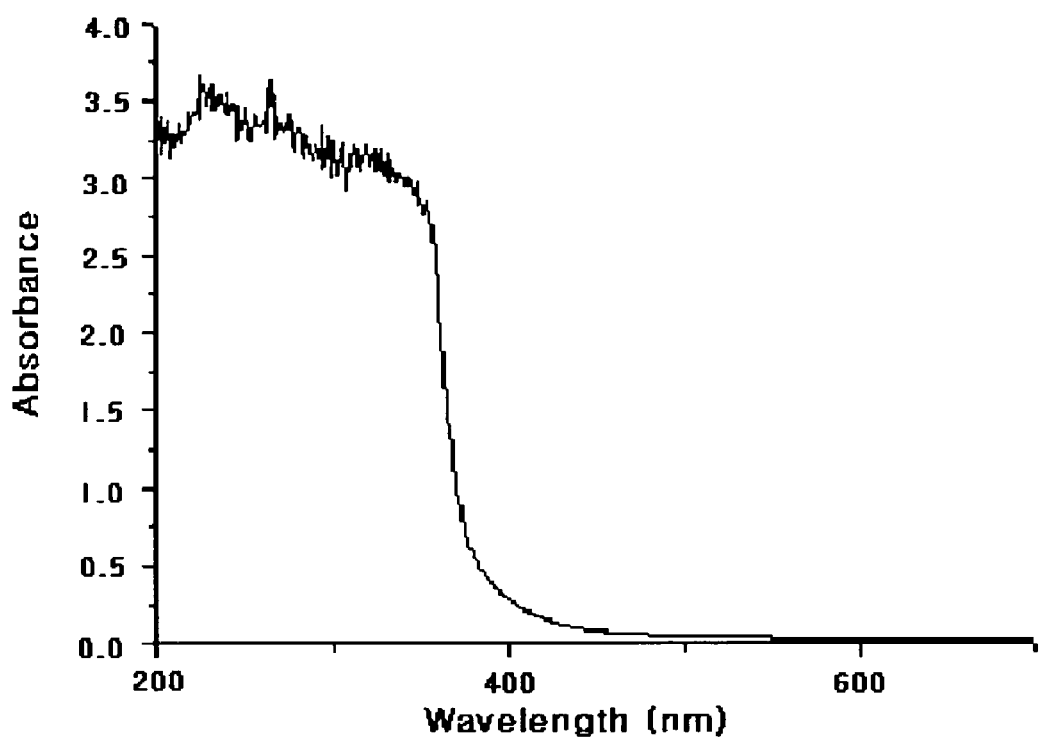
FIG. 1 shows the absorbance of the colloid solution of Example 1 at the wavelength regions of the UV/visible light. When measuring, the colloid solution was diluted with water, and thus contained 1.5% by weight of dispersed titanium dioxide ($TiO_2$).

In one aspect, the present invention provides a method of manufacturing a neutral and transparent titanium dioxide (TiO$_2$) colloid solution which is dispersed with nano-sized titanium dioxide particles. The present method can be classified into a water-based method and an alcohol-based method of manufacturing a titanium dioxide colloid solution depending on the kind of solvent used.

A water-based method of manufacturing a titanium dioxide colloid solution comprises the following steps:

(A) adding a titanium compound and a stabilizer to alcohol;

(B) slowly adding the reacted solution to distilled water by stirring;

(C) neutralizing the resulting solution by adding a basic solution; and (D) heating the neutralized solution at a temperature of above 85° C.

At step (A), a titanium compound and a stabilizer may be added in any order. Furthermore, after adding a titanium compound to an alcohol solution and before adding the stabilizer, 0.01~2% by weight of 40% aqueous titanium tetrachloride solution based on the total solution can be added to facilitate the hydrolysis. At this time, since a very vigorous exothermic reaction is carried out, the reaction is continued by sufficient stirring until the exothermic reaction is finished.

At step (B), stirring is continued for enough time, preferably more than 1 hour, after adding the distilled water to the reacted solution at room temperature. At step (C), the pH of the resulting solution is adjusted to 6~8 by slowly adding a basic solution. At step (D), after heating the solution for more than 7 hrs, a neutral and transparent titanium dioxide (TiO$_2$) colloid solution which is dispersed with titanium dioxide particles of anatase structure and a size of less than 10 nm may be obtained.

The alcohol-based method of manufacturing a titanium dioxide colloid solution comprises the following steps:

(a) adding a titanium compound and a stabilizer into alcohol;

(b) neutralizing the resulting solution by adding a basic solution thereto; and (c) heating the neutralized solution at a temperature of above 75° C. for more than 7 hrs.

At step (a), a titanium compound and a stabilizer may be added in any order. Furthermore, prior to step (b), 0.01~2% by weight of 40% aqueous titanium tetrachloride solution based on the total solution is added, or 2~10% by weight of distilled water based on the total solution is added to facilitate the hydrolysis. Also, the solution is stirred for enough time, preferably more than 1 hr at room temperature. At step (b), the pH of the resulting solution is controlled with 6~8 by adding slowly a basic solution. At step (c), after heating the solution for more than 7 hrs, a neutral and transparent titanium dioxide (TiO$_2$) colloid solution which is dispersed with titanium dioxide particles of anatase structure and a size of less than 10 nm may be obtained.

In the method of manufacturing the above water-based or alcohol-based titanium dioxide colloid solution, the heating procedure of step (D) and step (c) may be replaced with a hydrothermal reaction at a temperature of above 120° C. for 5 hrs in a high temperature, high pressure reactor. This hydrothermal reaction produces a titanium dioxide colloid solution of excellent structural crystallinity, within a short reaction period.

The alcohol to be used in the present invention is a lower alcohol having 1 to 4 carbon atoms such as methanol, ethanol, propanol, isopropanol or butanol. In the water-based system, 1~50% by weight of alcohol based on 100% by weight of the resulting titanium dioxide colloid solution is used; and in the alcohol-based system, 50~90% by weight of alcohol based on 100% by weight of the resulting titanium dioxide colloid solution is used.

In the present invention, the titanium compound can be any of the conventional titanium compounds and can be selected depending on the solvent used. However, if an inorganic titanium compound such as titanium tetrachloride or titanium sulfate is used, an excess of basic compound should be added to neutralize the solution. This results in too high concentration of salts in the solution. Thus, it is preferable to use a mixture of inorganic titanium compound and organic titanium compound rather than an inorganic compound alone. Preferably, titanium(IV) isopropoxide (tetraisopropanol titanium), titanium(IV) butoxide, titanium(IV) ethoxide(titanium tetraethanolate), titanium(IV) methoxide, titanium stearate or a mixture thereof is used. Amongst these titanium compounds, titanium(IV) isopropoxide (tetraisopropanol titanium) is most preferable. Titanium compound is added in such amount that Titanium dioxide of 1~5% by weight is dispersed in the resulting titanium dioxide solution.

The suitable stabilizer to be used in the present invention may be an organic acid having an alcohol group and a ketone group, or an organic acid having an alcohol group and an acetate group, and the salts thereof. Examples of the above organic acid include glycolic acid, glycolic salt, organic acid having a similar structure to glycolic acid and the salt thereof, oxalic acid and oxalate, and the salts thereof. Also, the above stabilizer may be selected from the group consisting of pentanediol, pentanedione, butanediol, butanedione, alkylacetoacetate, polyethylenglycol, cetyltrimethyl ammonium hydroxide, polyvinyl acetate, polyvinyl alcohol, trialkylalcohol amine, alkylalcohol ammonium, or the mixture thereof. The amount of the stabilizer to be added is dependent on the molecular weight of the stabilizer used and is usually at least 0.1% by weight, and preferably 1~3% by weight based on 100% by weight of resulting titanium dioxide colloid solution.

When an aqueous glycolic salt solution is used as a stabilizer, the amount of aqueous alkaline solution to be used in the neutralization may be reduced. When polyethylene glycol is used, the amount of polyethylene glycol to be added is dependent on its molecular weight. When the molecular weight of polyethylene glycol is about 3,000, about 0.1~2% by weight of polyethylene glycol is added. When polyethylene glycol and glycolic acid are used together, glycolic acid is added first and then reacted sufficiently, to prevent precipitation, and then polyethylene glycol is added thereto.

When polyvinyl acetate is used, the amount of polyvinyl acetate to be added is dependent on its molecular weight. When the molecular weight of polyvinyl acetate is about 100,000, about 0.1~2% by weight of polyvinyl acetate is added. When the molecular weight of polyvinyl acetate exceeds the above range, its solubility becomes low. It is, therefore, preferable to use polyvinyl acetate of low molecular weight. When polyvinyl alcohol is used, because its solubility is lower than that of polyvinyl acetate, polyvinyl alcohol of low molecular weight is added and then heated. By doing so, it is possible to enhance the solubility of polyvinyl alcohol, resulting in an enhanced stability of the resulting colloid solution.

A solution of any basic compound may be used in the neutralization step. The basic solution may be properly selected according to the required adherence property of the resulting colloid solution and its use. Preferably, a solution of sodium hydroxide, a basic compound of alkaline metals, an ammonium compound, an amine compounds, a basic compound with alkyl ammonium group, a basic compound of alkali earth metal, or a poly basic compound having a cationic ion such as aluminum ion may be used as a basic solution. Ammonia is especially effective in preventing titanium dioxide from coagulating, because it is a strong Lewis base and acts as a strong ligand for titanium ion.

The amount of basic solution to be used may depend on the kind of stabilizer, and the amount is controlled by adjusting the pH of the solution to be 6~8 with the pH meter mounted on the reactor. Also, water glass or sodium metasilicate can be used instead of a basic solution in the neutralizing step, and the resulting titanium dioxide colloid solution will have excellent adherence.

In the present method of manufacturing the titanium dioxide colloid solution, in addition to the titanium compound, if necessary, organic silicon compound, aluminum compound, zirconium compound, iron compound or the mixture thereof (hereinafter collectively referred as "organic silicon compound and the like") may be added. The silicon compound used in the present invention includes organic silicon compound having alkoxy group, alkyl acetoacetate functional group; organic silicon compound having glycolate, acetate group neighboring alcohol group or ketone group; organic silicon compound having ester and amine groups; and organic silicon compound having ketone and epoxide groups. The aluminum compound used in the present invention may be aluminum acetate or aluminum chloride.

The organic silicon compound and the like are added to the extent that the ratio of $TiO_2:SiO_2$, which are dispersed in the resulting colloid solution, is below 2:1 (below 50% by weight based on the content of titanium dioxide). The hydrolysis of organic silicon compound and the like together with titanium compound results in the improved adherence of the resulting titanium dioxide colloid solution to shaped articles.

The water-based or alcohol-based titanium dioxide colloid solution prepared by the present invention is cooled to room temperature, and 1 ml of the solution is diluted with 5 ml of water or alcohol, respectively. Thereafter the absorbance pattern of the solution is measured and analyzed using UV/visible spectroscope to estimate the size of nano particles and the uniformity of the size.

In another aspect, the present invention provides a new, neutral and transparent water-based or alcohol-based titanium dioxide colloid solution prepared by the said method, which contains 1~5% by weight of dispersed nano-sized titanium dioxide particles.

In another aspect, the present invention provides a multi-functional, normal temperature curing-type coating agent with excellent transparency, adherence, crystallinity, absorbance and stability, which comprises a novel, neutral and transparent water-based or alcohol-based titanium dioxide colloid solution prepared by the said method, and in which 1~5% by weight of nano-sized titanium dioxide particles are dispersed.

In still another aspect, the present invention provides products coated with the coating agent. The products to be coated include products of polymer, wood, leather, ceramic, metal, glass, paper, tile, wallpaper, fiber, and optical lens.

In another aspect, the present invention provides a neutral and transparent water-based or alcohol-based titanium dioxide colloid composition, in which the composition comprises 1~5% by weight of dispersed titanium dioxide; 0.1% or more by weight of the stabilizer selected from the group consisting of glycolic acid, pentanediol, pentanedione, butanediol, butanedione, aqueous glycolic salt solution, and a mixture thereof; basic solution in the amount capable of neutralizing the stabilizer; and the reminder of solvent such as water or alcohol.

Titanium dioxide colloid solution according to the present invention contains dispersed $TiO_2$ uniform nano particles below 10 nm in size, and it is clear and transparent. The above colloid solution is stable even after it is allowed to stand for a long time (more than 2 years). The solution is also stable without occurring aggregation even at a temperature higher than 100° C. Furthermore, since it contains to the extent of 5% by weight of dispersed titanium dioxide particles, if desired, it is possible to use the colloid solution with various concentrations. Also, the colloid solution is very stable without occurring aggregation even if it is mixed with other colloid solutions.

In another aspect, the present invention provides a multi-functional, normal temperature curing-type coating agent, which comprises the titanium dioxide colloid solution. The coating agent comprising the titanium dioxide colloid solution of the present invention has excellent transparency, adherence, crystallinity, absorbance and stability, and can be thus used as a coating agent for polymer, ceramic, fabric, metal, paper or glass-made articles and as a filler for transparent coating paint, and the like.

It is not necessary to use a specific material produced by a specific company to reproduce the Examples, and but it is preferable to use a compound with high purity. In the Examples, the materials of Dupont or Dow Corning Company were mostly used.

EXAMPLES

Example 1

175 g of tetraisopropanol titanium and 5 g of TEOS (TetraEthoxySilane) were added to 100 ml of ethanol, and then dissolved. Thereafter, 5 ml of 40% aqueous titanium tetrachloride solution were added thereto while the solution was slowly stirred, and the hydrolysis was carried out. 2 ml of pentanediol and 6 g of glycolic acid were added to the resulting solution and then reacted sufficiently. Thereafter, 750 ml of distilled water were added to the above solution by stirring vigorously. The stirring was continued at room temperature for about 1 hr. The pH of this solution was adjusted to 7 by adding slowly 3M aqueous sodium hydroxide solution to the solution. After heating the resulting solution at a temperature of 85° C. for 7 hrs, a clear and transparent colloid solution containing dispersed titanium dioxide nano particles (below 10 nm) having of anatase structure was obtained.

Example 2

After 6 g of glycolic acid were dissolved in 100 ml of ethanol, 150 g of titanium tetraethanolate and 5 g of TEOS were also dissolved thereto. 2 ml of 40% aqueous titanium tetrachloride solution were added to this solution, and the hydrolysis was carried out. Thereafter, 500 ml of distilled water was added slowly by stirring vigorously, and the stirring was continued at room temperature for 1 hour. The pH of the resulting solution was adjusted to 7 by adding slowly 3M aqueous sodium hydroxide solution. The solution was heated at a temperature of 85° C. for 7 hrs to obtain a clear and transparent colloid solution.

Example 3

The procedure of Example 1 was repeated, except that 8 g of glycolic acid instead of aqueous titanium tetrachloride solution were added. A clear and transparent colloid solution was obtained.

Example 4

The procedure of Example 1 was repeated, except that as a stabilizer, a mixture of 6 g of glycolic acid and 3 ml of polyethylene glycol was used. A clear and transparent colloid solution was obtained.

Example 5

After 175 g of tetraisopropanol titanium and 5 g of TEOS were dissolved in 100 ml of ethanol, 6 g of glycolic acid and 2 g of cetyltrimethyl ammonium chloride were added thereto, and then reacted sufficiently for 1 hr. 750 ml of distilled water was slowly added to the above solution while the solution was vigorously stirred. The stirring was continued at room temperature for about 1 hour. Thereafter, pH of the solution was adjusted to 7 by slowly adding 3M aqueous sodium hydroxide solution. After heating the resulting solution at a temperature of 85° C. for 7 hrs, a clear and transparent colloid solution containing dispersed titanium dioxide nano particles (below 10 nm) of antase structure was obtained.

Example 6

The procedure of Example 1 was repeated, except that polyvinyl acetate instead of cetyltrimethyl ammonium chloride was used. A clear and transparent colloid solution was obtained.

Example 7

After 175 g of tetraisopropanol titanium and 5 g of TEOS were dissolved in 20 ml of isopropanol, a solution of 6 g of glycolic acid and 2 ml of nitric acid dissolved in 750 ml of distilled water was slowly added to the above isopropanol solution by stirring vigorously. The stirring was continued at room temperature for 1 hour. Thereafter, pH of the solution was adjusted to 7 by slowly adding 3M aqueous sodium hydroxide solution. After heating the resulting solution at a temperature of 85° C. for 7 hrs, a clear and transparent colloid solution containing dispersed titanium dioxide nano particles (below 10 nm) of anatase structure was obtained.

Example 8

The procedure of Example 1 was repeated, except that the hydrothermal reaction was carried out at a temperature of above 120° C. for about 5 hrs in the high temperature and high pressure reactor, instead of heating at a temperature of above 85° C. for about 7 hrs. A clear and transparent colloid solution was obtained.

Example 9

After 2 ml of pentanediol and 6 g of glycolic acid were dissolved in 800 ml of ethanol, 175 g of tetraisopropanol titanium and 5 g of TEOS were added thereto. 10 ml of 40% aqueous titanium tetrachloride solution were added to this solution by stirring slowly and the hydrolysis was carried out. At this step, a vigorous exothermic reaction occurred, and the reaction was continued until the exothermic reaction stopped. Thereafter, pH of the solution was adjusted to 7 by slowly adding 3M aqueous sodium hydroxide solution. After heating the resulting solution at a temperature of 75° C. for 7 hrs, a clear and transparent colloid solution containing dispersed titanium dioxide nano particles (below 10 nm) of antase structure was obtained.

Example 10

After 6 g of glycolic acid were dissolved in 800 ml of ethanol, 150 g of titanium tetraethanolate and 5 g of TEOS were added thereto. 2 ml of 40% aqueous titanium tetrachloride solution was added to this solution, and the hydrolysis was carried out. Thereafter, 500 ml of distilled solution was added thereto, and then hydrolyzed sufficiently while the solution was stirred for about 1 hour. pH of the solution was adjusted to 7 by slowly adding 3M aqueous sodium hydroxide solution. After heating the resulting solution at a temperature of 75° C. for 7 hrs, a clear and transparent colloid solution containing dispersed titanium dioxide nano particles (below 10 nm) of anatase structure was obtained.

Example 11

The procedure of Example 9 was repeated, but using 8 g of glycolic acid and without adding the aqueous titanium tetrachloride solution. A clear and transparent colloid solution containing dispersed titanium dioxide nano particles (below 10 nm) of anatase structure was obtained.

Example 12

After 175 g of tetraisopropanol titanium and 5 g of TEOS were dissolved in 800 ml of ethanol, 6 g of glycolic acid and 2 ml of cetyltrimethyl ammonium hydroxide were added thereto and the hydrolysis was sufficiently carried out. Thereafter, pH of the solution was adjusted to 7 by slowly adding 3M aqueous sodium hydroxide solution. After heating the resulting solution at a temperature of above 75° C. for 7 hrs, a clear and transparent colloid solution containing dispersed titanium dioxide nano particles (below 10 nm) of anatase structure was obtained.

Example 13

After 175 g of tetraisopropanol titanium and 5 g of TEOS were dissolved in 800 ml of ethanol, 6 g of glycolic acid and 2 ml of nitric acid were added thereto. The stirring was continued at room temperature for 1 hour. Thereafter, pH of the solution was adjusted to 7 by slowly adding 3M aqueous sodium hydroxide solution. After heating the resulting solution at a temperature of above 75° C. for 7 hrs, a clear and transparent colloid solution containing dispersed titanium dioxide nano particles (below 10 nm) of anatase structure was obtained.

Example 14

The procedure of Example 9 was repeated, except that the hydrothermal reaction was carried out at a temperature of above 120° C. for about 5 hrs in the high temperature and high pressure reactor, instead of heating at a temperature of above 75° C. for about 7 hrs. A clear and transparent colloid solution containing dispersed titanium dioxide nano particles (below 10 nm) of anatase structure was obtained.

Example 15

The procedure of Example 9 was repeated, except that pH of the solution was adjusted by using ammonia instead of sodium hydroxide. A clear and transparent colloid solution containing dispersed titanium dioxide nano particles (below 10 nm) of anatase structure was obtained.

Figure 2:
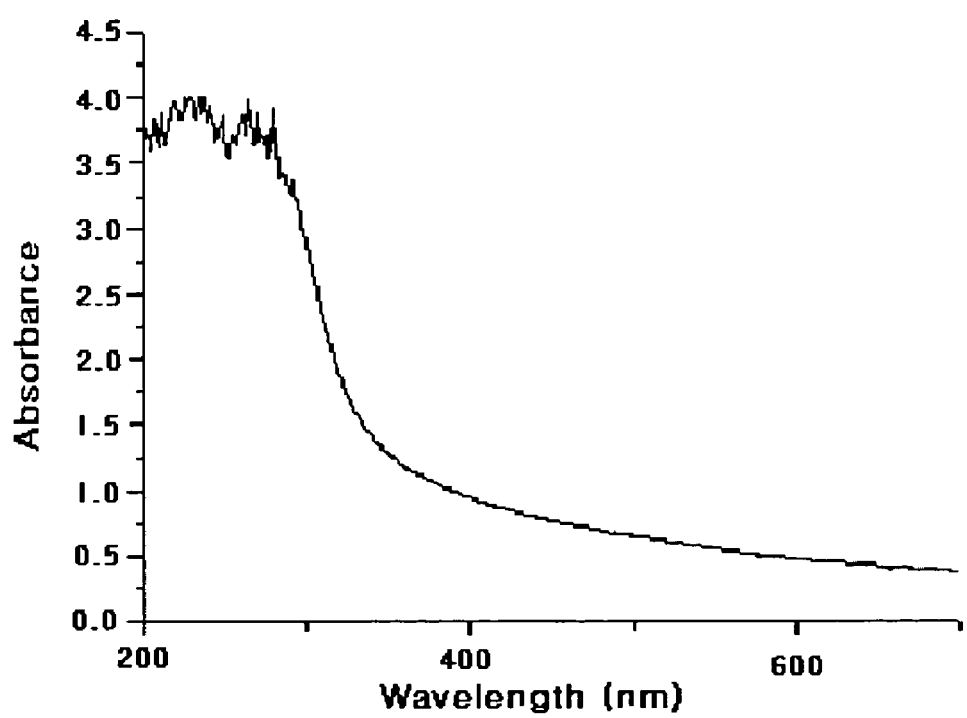
FIG. 2 shows the absorbance of the colloid solution of Example 9 at the wavelength regions of the UV/visible light. When measuring, the colloid solution was diluted with water, and thus contained 1.5% by weight of dispersed titanium dioxide ($TiO_2$).
Figure 3:
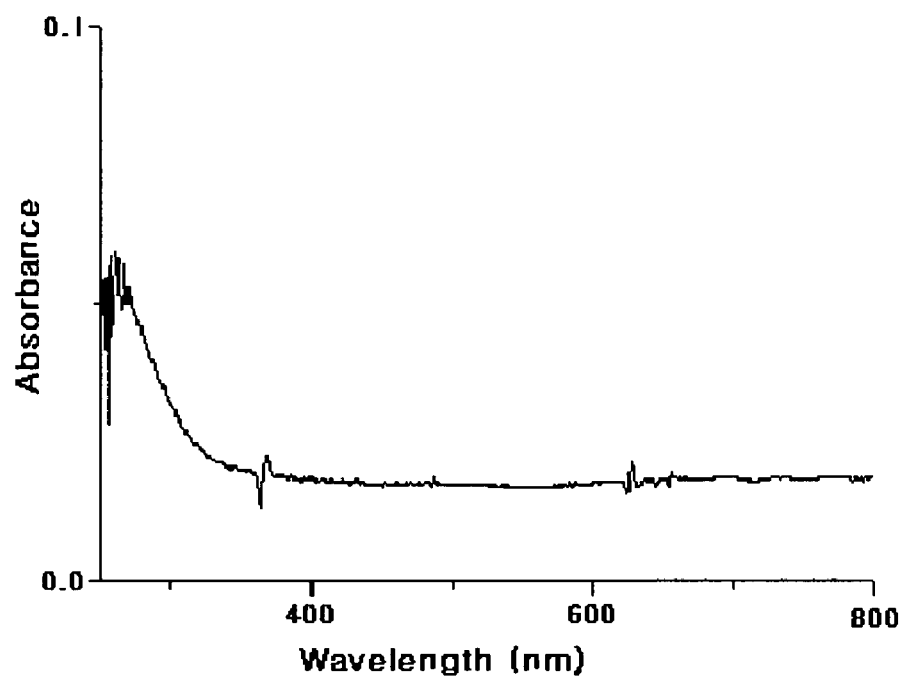
FIG. 3 shows the absorbance of the thin film coating of the colloid solution of Example 1 on the glass plate, measured at the wavelength regions of the UV/visible light.
Figure 4:
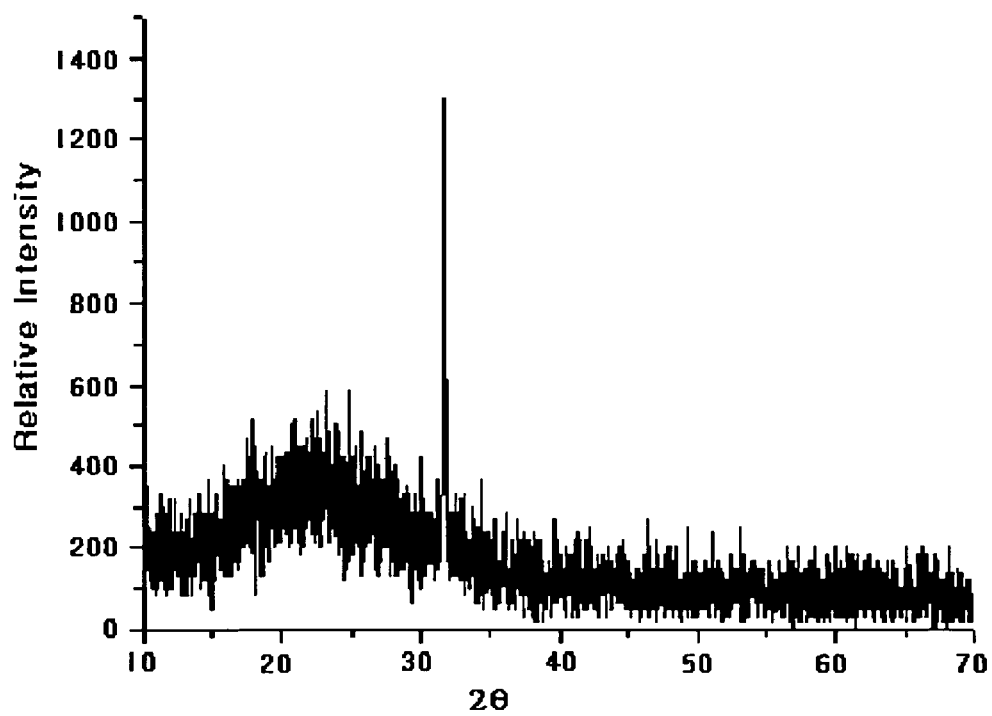
FIG. 4 shows the crystallinity of the thin film coating of the colloid solution of Example 1 on the glass plate, measured by XRD.
Figure 5:
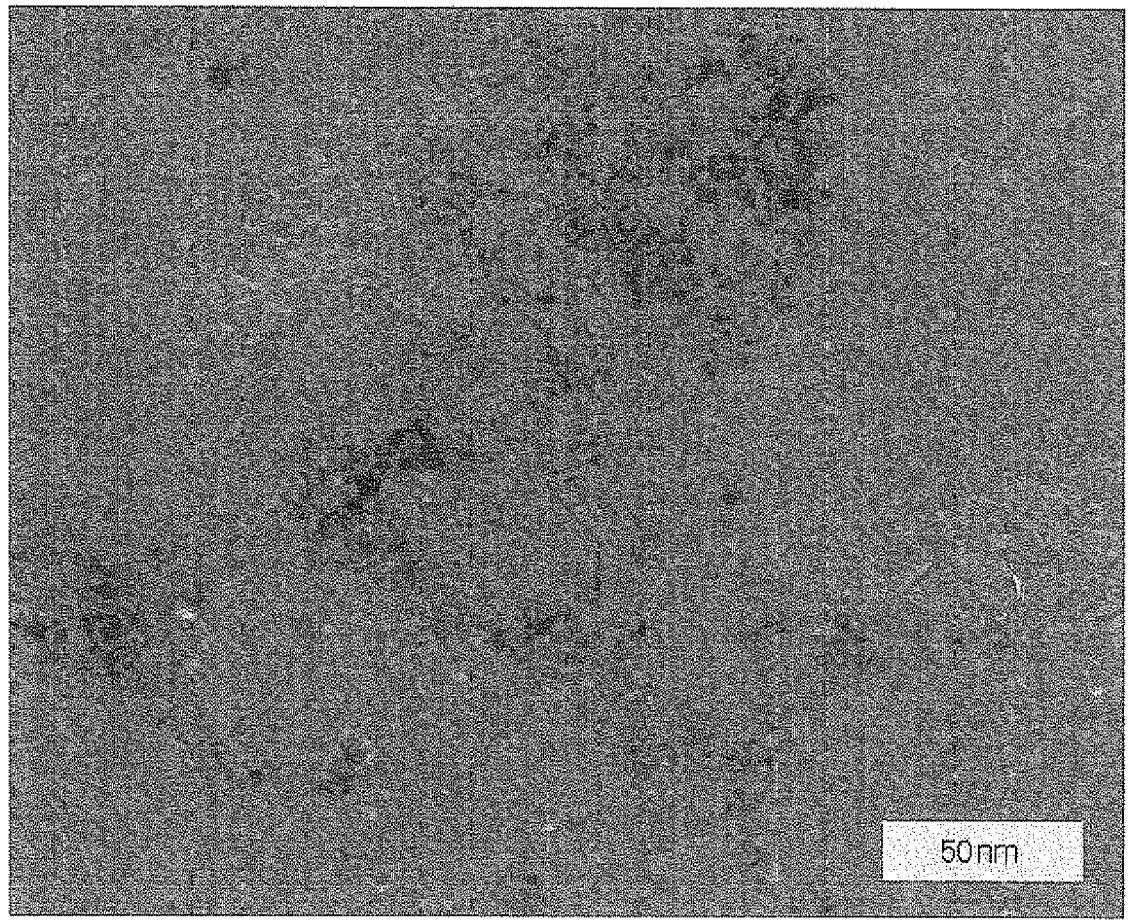
FIG. 5 shows the morphology of the $TiO_2$ particles dispersed in the colloid solution of Example 1 measured by transmission electron microscope (TEM).
Figure 6:
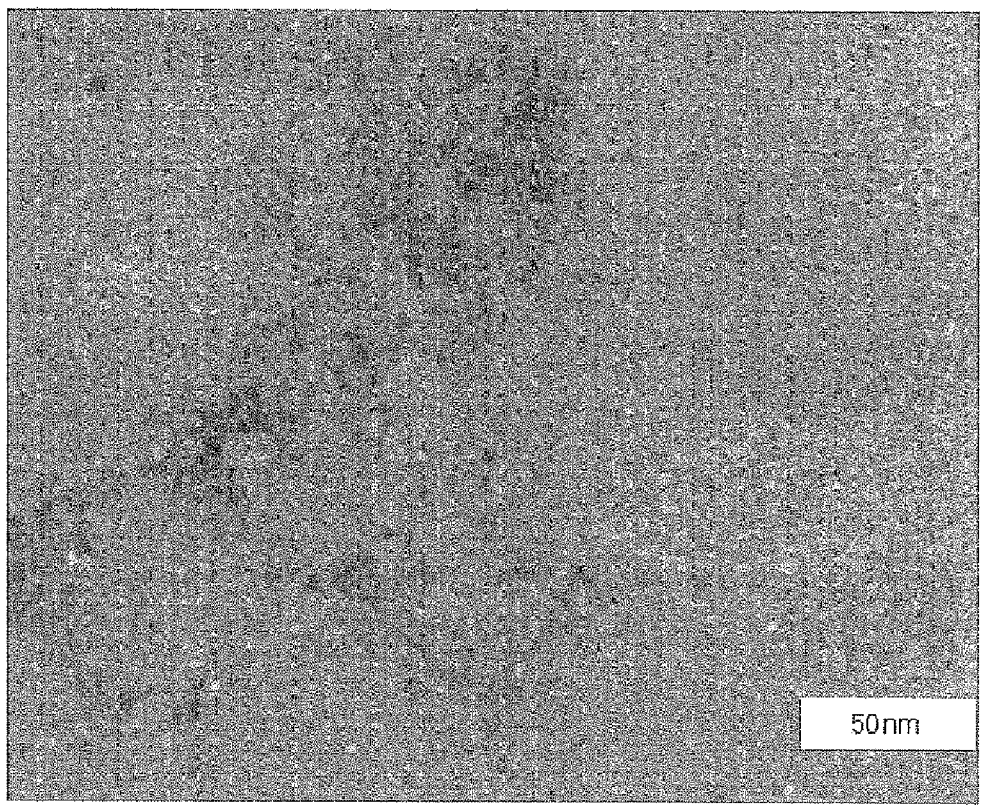
FIG. 6 shows the morphology of the $TiO_2$ particles dispersed in the colloid solution of Example 9 measured by TEM.
Figure 7:
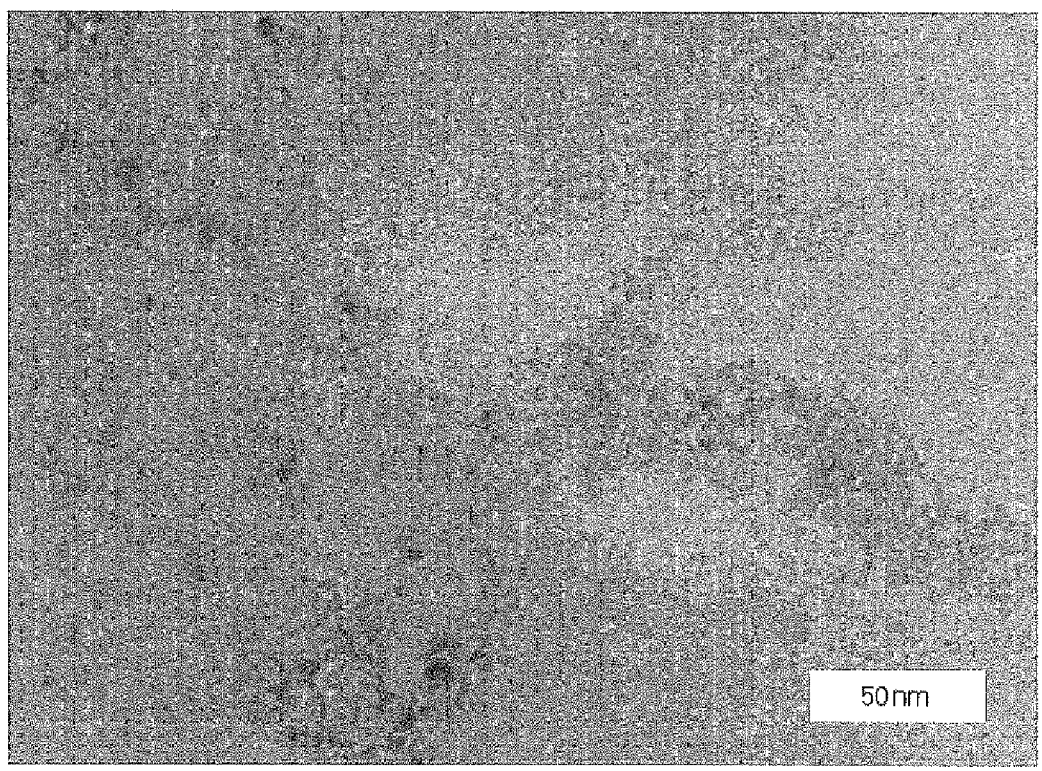
FIG. 7 shows the morphology of the $TiO_2$ particles dispersed in the colloid solution of Example 8 measured by TEM.

The neutral, water-based or alcohol-based titanium dioxide colloid solutions prepared in the Examples were tested for the following properties, and the results were shown in Tables 1 and 2, and FIGS. 1 to 7.

Transparency 1 ml of water-based or alcohol-based titanium dioxide colloid solution was diluted with 5 ml of water or alcohol, respectively. The degree of light scattering in the solution was measured by using the UV/visible light spectroscope at the region of 410 nm wavelength (the shortest wavelength region in which the light was not absorbed but scattered).

Adherence 1 ml of water-based or alcohol-based titanium dioxide colloid solution was diluted with 5 ml of water or alcohol, respectively. The solution was applied to the surface of a glass plate by using a spin coating method, and then heat-treated in the thermostatic bath at a temperature of 110° C., and then rubbed with an eraser. The absorbance was measured by using the UV/visible light spectroscope at 350 nm.

Stability

After one month has elapsed, the degree of variance of the turbidity for titanium dioxide colloid solution was measured. The turbidity was measured with the same method for transparency.

Absorbance

It is a relative absorbance. 1 ml of titanium dioxide colloid solution was diluted with 5 ml of distilled water and absorbance was measured at 350 nm wavelength.

Crystallinity for the Nano Particles 1 ml of water-based or alcohol-based titanium dioxide colloid solution was diluted with 5 ml of water or alcohol, respectively. The solution was applied twice on the surface of the glass plate by using a spin coating method, heat-treated at a temperature of 110° C. in the thermostatic bath, and then the crystallinity of the thin film was measured by using the X-ray Diffraction (XRD). The XRD was carried out at 1° because the film was very thin, and 2Θ was measured in the range from 10° to 80°, the scanning rate was 2°/min.

TABLE 1

Physical properties of water-based $TiO_2$ colloid solution

| Example | Transparency | Adherence | Crystallinity | Absorbance | Stability |
|---|---|---|---|---|---|
| 1 | A | A | B | 2.5 | A |
| 2 | A | A | A | A | A |
| 3 | A | A | B | B | A |
| 4 | A | B | B | B | A |
| 5 | A | B | A | C | A |
| 6 | B | B | B | B | B |
| 7 | A | A | A | A | A |
| 8 | A | A | A | A | A |

Note: A: excellent, B: good, C: normal, D: poor
For absorbance, A: higher than 2.5 of the Example 1, B: same as 2.5 of the Example 1, C: lower than 2.5 of the Example 1

TABLE 2

Physical properties of alcohol-based $TiO_2$ colloid solution

| Example | Transparency | Adherence | Crystallinity | Absorbance | Stability |
|---|---|---|---|---|---|
| 9 | A | A | B | 2.0 | A |
| 10 | A | A | B | B | A |
| 11 | A | B | B | B | A |
| 12 | A | B | B | B | B |
| 13 | A | A | A | B | A |
| 14 | A | A | A | A | A |
| 15 | A | B | A | B | B |

INDUSTRIAL APPLICABILITY

A titanium dioxide colloid solution according to the present invention comprises dispersed titanium dioxide nano particles, and the colloid solution is clear and transparent. The colloid solution of the present invention is stable even after it is allowed to stand for a long time (more than two years), and the solution is also stable without occurring aggregation even at a temperature of above 100° C.

Furthermore, since the colloid solution contains to the extent of 5% by weight of dispersed titanium dioxide particles, if desired, it is possible to use the colloid solution with various concentration. Also, the colloid solution is very stable without occurring aggregation even if it is mixed with other colloid solutions.

In addition, a multifunctional, normal temperature curing-type coating agent is provided, which is composed of the titanium dioxide colloid solution. The coating agent, which is titanium dioxide colloid solution according to the present invention, has excellent transparency, adherence, crystallinity, absorbance and stability, and can be thus used as a coating agent for polymer, wood, leather, metal, ceramic, glass, paper, tile, wallpaper, a fiber, or optical lens article or as a filler for transparent coating paint.

The invention claimed is:

1. A method of manufacturing a neutral and transparent metal oxide colloid solution containing dispersed titanium dioxide nano particles, comprising the following steps:
    (i) adding a titanium compound and a stabilizer to alcohol to produce a titanium-containing solution,
    the stabilizer being selected from the group consisting of: glycolic acid, glycolic salt, oxalic acid, pentanediol, pentanedione, butanedione, alkylacetoacetate, polyethyleneglycol, cetyltrimethyl ammonium hydroxide, polyvinyl acetate, polyvinyl alcohol, trialkanolamine and a mixture thereof, and
    the titanium compound being selected from the group consisting of titanium(IV) isopropoxide, titanium(IV) butoxide, titanium(IV) ethoxide, titanium(IV) methoxide, titanium(IV) stearate and a mixture thereof;
    (ii) neutralizing the titanium-containing solution of the previous step by adding a basic solution to produce a neutralized solution, pH of the neutralized solution being controlled in a range of 6-8;
    (iii) heating the neutralized solution at a temperature of above 75° C.,
    (iv) slowly adding distilled water to the titanium-containing solution in steps (i) and (ii) while stirring,
    wherein in step (i), the titanium compound and the stabilizer can be added in any order, and
    wherein 40% (w/w) aqueous titanium tetrachloride solution is added prior to adding the stabilizer and after adding the titanium compound to the alcohol in step (i).

2. The method according to claim 1, wherein, based on the metal oxide colloid solution, the alcohol is added in the amount of 1-50% by weight, the stabilizer is added in the amount of at least 0.1% by weight, and the titanium compound is added in the amount of 1-5% by weight, which is calculated in terms of the amount of the titanium dioxide dispersed in the metal oxide colloid solution, the balance being water.

3. The method according to claim 1, wherein the alcohol is selected from the group consisting of lower alcohol having 1-4 carbon atoms.

4. The method according to claim 1, wherein step (iii) is carried out at a temperature of above 85° C.

5. The method according to claim 1, wherein the basic solution is a solution of an alkali metal compound, an ammonium compound, an amine compound, an alkyl ammonium compound, an alkaline earth metal compound, or a poly basic compound having a cationic ion.

6. The method according to claim 1, wherein in step (i), in addition to the titanium compound, an organic silicon compound, an aluminum compound, a zirconium compound, an iron compound or a mixture thereof is further added.

* * * * *